Feb. 5, 1957        B. H. GOEHRING        2,780,040
SWIVEL TABLE ALIGNMENT
Filed Aug. 17, 1955        2 Sheets-Sheet 1
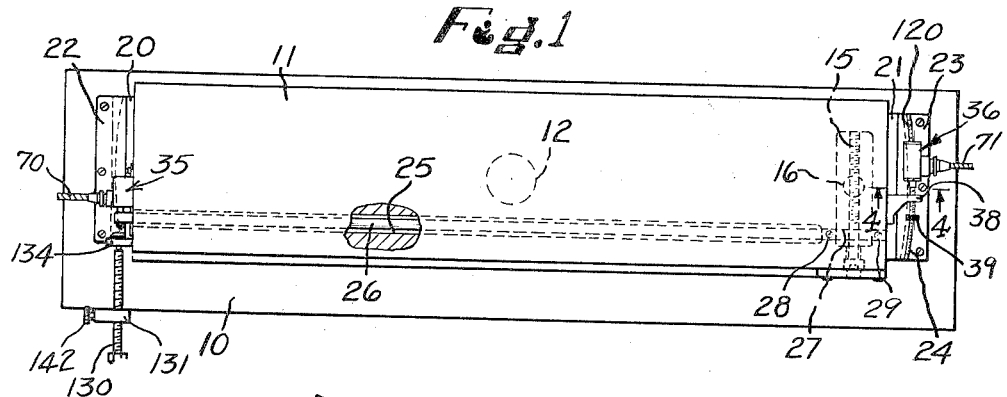
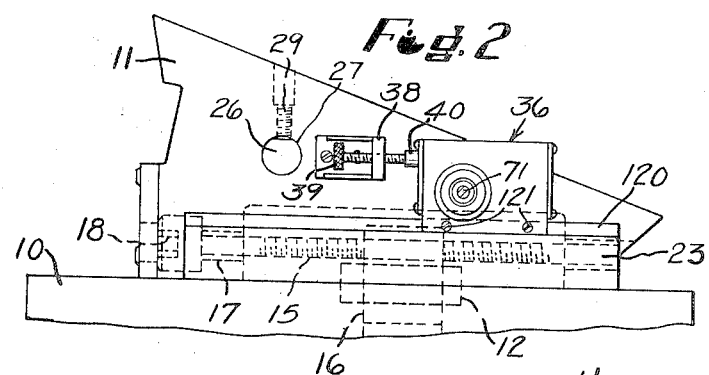
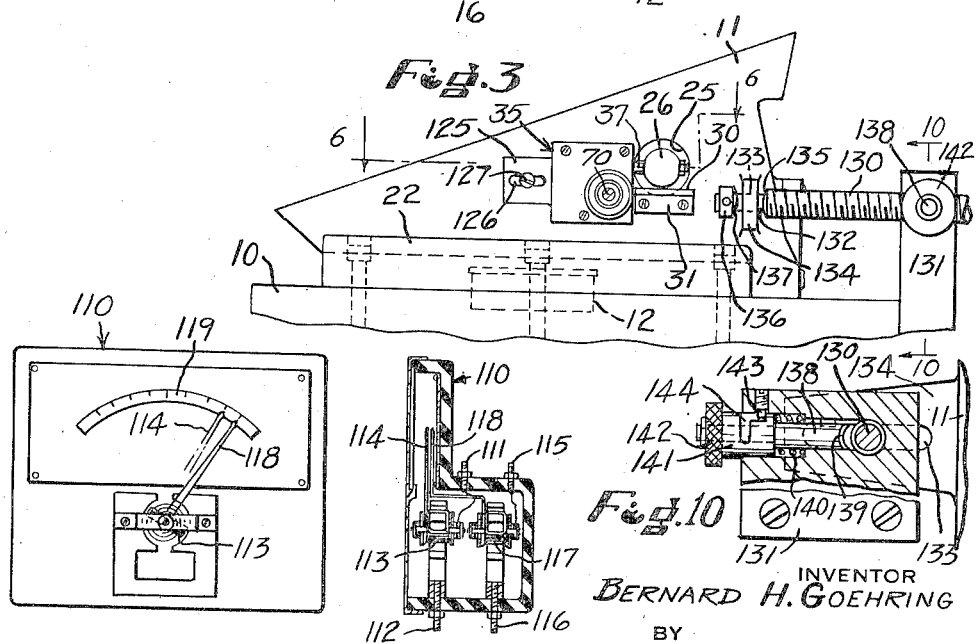
INVENTOR
BERNARD H. GOEHRING
BY
Harold W. Eaton
ATTORNEY

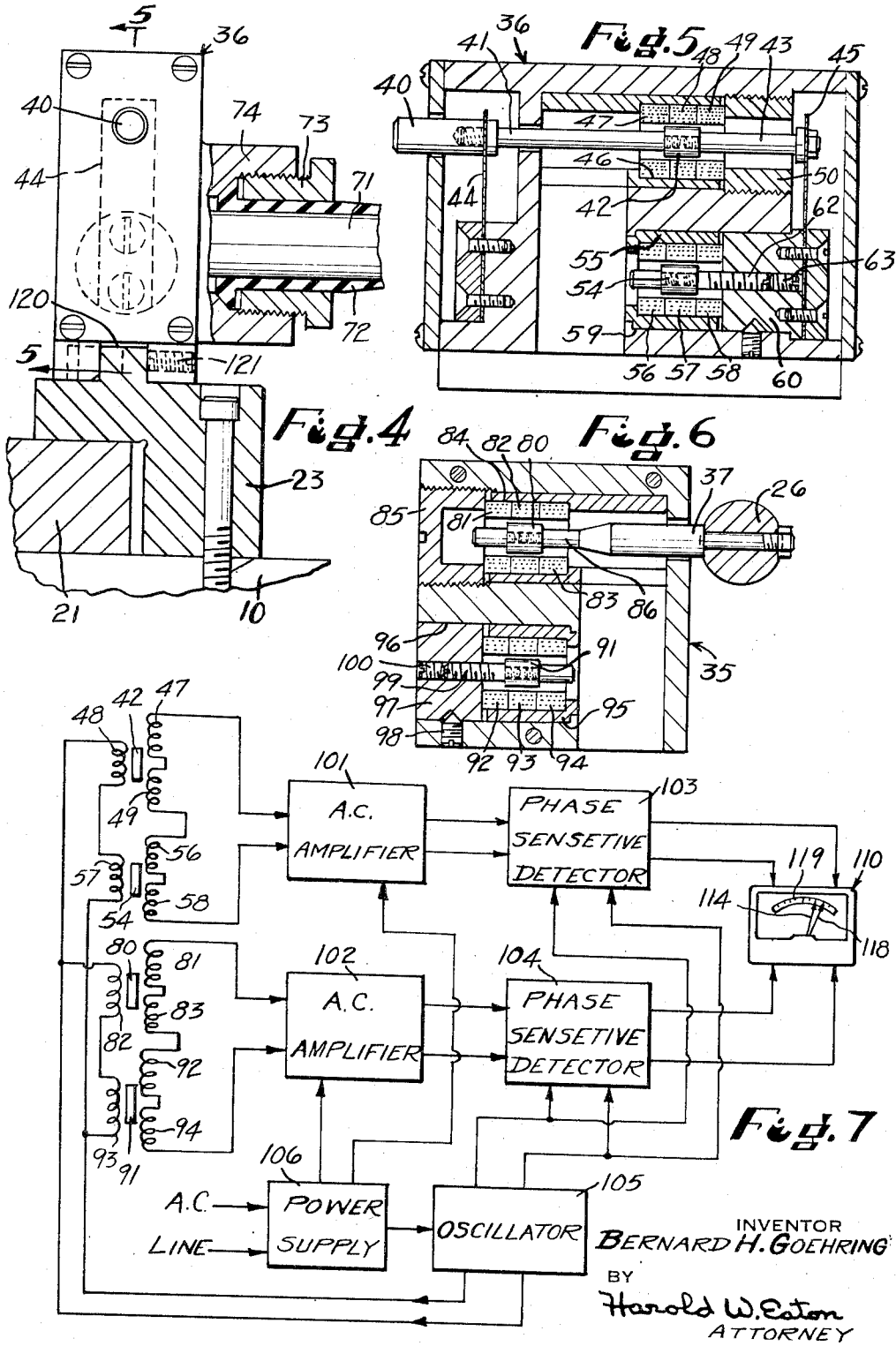

United States Patent Office 2,780,040
Patented Feb. 5, 1957

2,780,040

SWIVEL TABLE ALIGNMENT

Bernhard H. Goehring, Worcester, Mass., assignor to Norton Company, Worcester, Mass., a corporation of Massachusetts Application August 17, 1955, Serial No. 528,927

6 Claims. (Cl. 51—240)

The invention relates to machine tools, and more particularly to an electric swivel control for precisely locating swivel tables.

One object of the invention is to provide a simple and thoroughly practical swivel adjusting mechanism for a machine tool table. Another object of the invention is to provide apparatus for precisely indicating the extent of angular adjustment of a swivel table. Another object is to provide a control indicator arranged to give a precise indication of taper in terms of taper as in thousandths or fractions of thousandths of an inch per inch or per foot. Another object is to provide apparatus at one end of the swivel table for giving an indication of taper. Another object is to provide apparatus at the other end of the swivel table for giving an indication of deflection of the swivel table. Another object is to provide means to adjust the swivel table to facilitate compensating for deflection. Another object is to provide a single indicating meter having duplicate indicating needles, one to indicate taper, and the other to indicate deflection. Other objects will be in part obvious or in part pointed out hereinafter.

In the accompanying drawings, in which is shown one of various possible embodiments of the mechanical features of the invention in which;

Fig. 1 is a plan view of a grinding machine work table and a swivel table embodying the invention, Fig. 2 is a fragmentary right hand end elevation, on an enlarged scale, of the work and swivel tables showing the swivel indicating apparatus;

Fig. 3 is a fragmentary left hand end elevation, on an enlarged scale, of the work and swivel tables showing the deflection indicating apparatus;

Fig. 4 is a fragmentary vertical sectional view, on an enlarged scale, taken approximately on the line 4—4 of Fig. 1, through the right hand end pick-up unit and associated parts;

Fig. 5 is a vertical sectional view, taken approximately on the line 5—5 of Fig. 4, through the linear variable differential transformers and associated parts;

Fig. 6 is a vertical sectional view, on an enlarged scale, taken approximately on the line 6—6 of Fig. 3, through the linear variable differential transformers of the left hand end pick-up unit;

Fig. 7 is an electric diagram;

Fig. 8 is a front elevation of a meter;

Fig. 9 is a vertical sectional view through the meter as shown in Fig. 8; and

Fig. 10 is a fragmentary vertical sectional view, taken approximately on the line 10—10 of Fig. 3, showing the means for rendering the deflection adjusting mechanism operative or inoperative.

A portion of a machine tool has been illustrated in the drawings, comprising a longitudinally movable table 10 which supports a swivel table 11. The swivel table 11 serves as a work support which may include a well known chuck or a pair of spaced work supporting centers (not shown) for rotatably supporting a work piece to be ground. The swivel table 11 is arranged to swivel in a horizontal plane about a vertically arranged pivot stud 12 carried by the table 10. The opposite ends of the swivel table 11 are provided with projecting ends 20 and 21. A pair of clamp and guide blocks 22 and 23 are provided on the table 10 to facilitate clamping the projecting ends 20 and 21 to the table 10 after the swivel table 11 has been swivelled to the desired extent. The clamping blocks 22 and 23 may be tightened to clamp the swivel table 11 in adjusted position relative to the table 10. If desired, however, the clamping blocks 22 and 23 may be partially tightened so as to provide sufficient friction normally to hold the swivel table 11 in adjusted position, in which condition the swivel table 11 may be swivelled without releasing the clamping blocks 22 and 23.

A swivelling mechanism is provided comprising a rotatable screw 15 carried by the swivel table 11 which meshes with or engages a nut 16 mounted on the table 10. The nut 16 is free to rotate and to slide longitudinally relative to the table 10 during a swivel adjustment of the swivel table 11. The screw 15 is rotatably journalled in a bearing 17 which is fixedly mounted on the swivel table 11. The left hand end of the screw 15 (Fig. 2) is provided with an enlarged head having a formed aperture 18 by means of which the screw may be rotated by means of a manually operable wrench.

In order to facilitate swiveling the table to a predetermined angle the clamping block 23 is provided on its upper surface with an arcuate-shaped graduated scale 24. The graduations of the scale 24 may read or indicate taper in inches per foot. The above described swivelling mechanism serves to facilitate a preliminary swivel setting of the swivel table 11. After the preliminary setting has been made, a work piece may then be ground after which the taper is measured by a micrometer caliper to determine the extent of error, if any, in the preliminary setting. In order to make a precise adjustment necessary to secure the desired and predetermined taper, a sensitive indicating apparatus to be hereinafter described may be utilized.

The swivel adjusting screw 15 and associated nut 16 are mounted at the right hand end of the swivel table 11 which in a cylindrical grinding machine supports a footstock (not shown). In such a machine the headstock which is a relatively heavy part is usually supported on the left hand end of the swivel table 11. When a swivel adjustment is made, due to the weight on the table, the table may be slightly deflected due to the heavy weight on the left hand end thereof causing additional friction between the swivel table 11 and the longitudinally movable table 10.

It is desirable to provide an indicator to show just how much deflection has taken place when the table 11 is swivelled. This is preferably accomplished by provision of a longitudinally extending cylindrical clearance bore or hole 25 in the swivel table 11. A deflection rod 26 passes through the clearance hole 25. The right hand end of the deflection rod 25 fits within a hole 27 (Fig. 1) within the swivel table 11 and is fastened therein by means of a pair of spaced set screws 28 and 29. The left hand end of the deflection rod 26 projects beyond the left hand end of the swivel table 11 and rests upon a horizontally arranged knife-edge or a plane surface 30 formed on a bracket 31 (Fig. 3) fastened on the left hand end of the swivel table 11. The bracket 31 serves to support the left hand end of the deflection rod 26 and is arranged to allow the deflection rod to slide thereon in case the table is deflected during swivel adjustment thereof. In order to determine the extent of deflection in the swivel table 11, a pick-up unit 35 is adjustably fastened to the left hand end of the swivel table 11. A slide rod 37 of the pick-up unit 35 is fastened to the left hand end of the deflection rod 26. Any deflection of the swivel table 11 during a swivel adjustment causes a relative motion between the left hand end of swivel table 11 and the left hand end of the deflection rod 26 which imparts axial movement to the slide rod 37 of the pick-up unit 35.

A pick-up unit 36 is adjustably mounted on the right hand end of the longitudinally movable table 10. A bracket 38 is fastened to the right hand end of the swivel table 11 and serves as a support for an adjusting screw 39 which is arranged in axial alignment with an actuating plunger 40 of the pick-up unit 36.

The actuating plunger 40 (Fig. 5) of the pick-up unit 36 is connected to the left hand end of a rod 41 of a non-ferrous metal. The other end of the rod 41 is secured to a ferrous metal core 42. A rod 43 of non-ferrous metal is connected to the right hand end of the core 42. A flat spring 44 supports the rods 40—41 and a flat spring 45 supports the right hand end of the rod 43. It will be readily apparent from the foregoing disclosure that actuation of the screw 39 serves to move the rods 40—41—43 in an axial direction to impart an axial adjustment to the core 42. The upper part of the pick-up unit 36 is provided with a cylindrical aperture 46 which is arranged to support a plurality of coils 47, 48 and 49 of a linear variable differential transformer. A sleeve 50 is screw threaded into the right hand end of the aperture 46 and serves to hold the coils 47, 48 and 49 in position. The linear variable differential transformer will be hereinafter referred to as L. V. D. T. It will be now seen that the L. V. D. T. 42—47—48—49 is operated whenever the screw 39 engages and moves the rod 40 in an axial direction and that the springs 44 and 45 provide a restoring force normally to maintain the core 42 in a central position when the screw 39 is out of engagement with the rod 40.

There is a second L. V. D. T. in the pick-up unit 36 comprising a core 54 and three coils 56, 57 and 58. The coils 56, 57 and 58 are supported by a sleeve 55 which fits within a cylindrical aperture 59. The core 54 is mounted on the left hand end of an adjusting screw 62 (Fig. 5), by means of which the core may be adjusted in an axial direction. A set screw 63 is provided to facilitate locating the screw 62 in adjusted position. The function of the L. V. D. T. 54—56—57—58, which is connected electrically in opposition to L. V. D. T. 42—47—48—49 as will be more fully described hereinafter, is to stabilize the zero output point of the pick-up unit 36. Practical L. V. D. T.'s exhibit a finity non zero null voltage due to slight manufacturing inaccuracies in the wind of the coils, mechanical asymmetry of the core piece and winding formation, imperfect alignment of core and coils, etc. Temperature changes affect the physical dimensions of the core piece, its magnetic permeability and conductivity, and the resistance and inductance of the coil windings, which is in any or all of which may affect the magnitude of the null voltage and the position of the core at which it occurs. Similarly, changes in the excitation voltage applied to the primary winding, as described below, effects the operating point of the induction curve of the core piece, heating of the coils, harmonic generation, etc. These residual effects are significant in L. V. D. T.'s because the output voltage is the difference between induced E. M. F.'s in two secondary coils, said difference being a small fraction of the induced E. M. F. To achieve the most stable operation, a second L. V. D. T. 54—56—57—58, preferably having characteristics matching that of the first L. V. D. T. 42—47—48—49, is mounted in physical proximity to, and excited from the same source as the first, with its output connected substractively in series with that of the first L. V. D. T. to effect a reduction in the new output zero drift arising from those causes which affect both L. V. D. T.'s equally.

Changes in the exciting voltage applied to the primary winding can change the zero or null position and as the operator sets the meter needles to zero position this might, at first blush, seem to be of no consquence. However, if between the time the operator sets the needles to the zero position and the time he turns the swivel adjusting screw to correct adjustment, there is a change in the exciting voltage, it can produce an error were it not for the second L. V. D. T. It is well known that voltages on power lines can fluctuate within considerable limits dependent upon the load upon the line and at any second the closing of a switch somewhere in the system to double the load on the line might occur, changing the exciting voltage. Furthermore, if there were no second L. V. D. T. to counterbalance such changes the operator, seeing the needles of the meter move during the course of a machining operation might take a good many minutes, might conclude that the clamping screws for holding the swivel table 11 to the table 10 and which are preferably provided to keep loads off the nut and screw adjusting mechanism, had slipped. With the second L. V. D. T. in accordance with the preferred embodiment of this invention the operator can watch the needles of the meter to be sure that the clamping screws have not slipped.

On the other hand, for applications where the sensitive requirements are less stringent, inherent drift of the first L. V. D. T. may have only a trivial influence on indications of a meter. In which case the second, compensating L. V. D. T. may be omitted. It is assumed in the balance of this description that wherever the second L. V. D. T. is included it is only by way of illustration and it may, for many practical embodiments be left out of the apparatus.

The pick-up unit 35 is preferably adjustably mounted on the left hand end of the swivel table 11 and serves to give an indication of the deflection of the table during a swivel adjustment thereof. The pick-up unit 35 is provided with an L. V. D. T. comprising a core 80 and a plurality of coils 81, 82 and 83 (Fig. 6). The coils are supported in a cylindrical bore 84 and are held in position by a plug 85 threaded into a threaded aperture in the pick-up unit 35. The core 80 is mounted on the left hand end portion 86 of a rod 87. The right hand end of the rod 87 is fixedly connected to the left hand end of the deflection rod 26 (Fig. 1). It will be readily apparent that during a swivel adjustment of the table 11, any deflection of the table 11 will produce a relative motion of the core 80 relative to the coils 81, 82 and 83.

The pick-up unit 35 (Fig. 6) is provided with a second L. V. D. T. comprising a core 91 and a plurality of coils 92, 93 and 94. The coils 92, 93 and 94 fit within a sleeve 95 which in turn fits within a cylindrical bore 96 formed within the unit 35. The coils 92, 93 and 94 are held in position by means of a sleeve 97 which fits within the bore 96 and is held in position therein by a set screw 98. The core 91 is fastened to the right hand end of an adjusting screw 99. A set screw 100 is provided to facilitate locking the adjusting screw 99 in adjusted position. The function of the L. V. D. T. 91—92—93—94, which is connected electrically in opposition to the L. V. D. T. 80—81—82—83 as will be more fully described hereinafter, is to stabilize the zero output point of the pick-up unit 35.

The L. V. D. T.'s of the pick-up units 35 and 36 are connected to the electronic mechanism by cables 70 and 71, as indicated in Fig. 1. Fig. 4 illustrates the mechanical features of the cable connection where the cable 71 is located in an insulating bushing 72 held in place by means of a threaded sleeve 73 screwed into a boss 74 on the end wall of the pick-up unit 36. It is believed that the foregoing description together with the drawings amply explains the mechanical features of the actuating L. V. D. T.'s and the associated parts which mechanical features can be widely varied, and I will now describe the electrical and electronic features of Fig. 7 including also the meter of Figs. 8 and 9. Where non-ferrous parts were mentioned other low permeable material could be used and "ferrous" is to be deemed to mean any material satisfactorily permeable.

In Fig. 7, the L. V. D. T. 42—47—48—49 and the L. V. D. T. 54—56—57—58, whose secondary windings 47—49 and 56—58 are subtractively connected as hereinbefore explained, provide the signal input to A. C. amplifier 101, said signal voltage being proportional to the excitation current supplied to primary windings 48 and 57 from oscillator 105 and to the displacement relative to its null position of core 42. The output signal from A. C. amplifier 101 is the signal input to phase sensitive detector 103, a phase reference carrier voltage being supplied to phase sensitive detector 103 from oscillator 105. The output voltage of phase sensitive detector 103 is linearly proportional to the component of the input signal to A. C. amplifier 101 in phase with the reference voltage applied to phase sensitive detector 103. Said output voltage is connected to an indicating meter 110, and more specifically to terminals 111 and 112 as shown in Fig. 9, these terminals being internally connected to the moving coil 113 of a D'Arsonval direct current meter whose indicating pointer is 114.

The amplification or gain of A. C. amplifier 101 is adjusted to a suitable value so that movement of needle 114 from center scale to full scale represents a useful range of taper adjustment, such as .010" per foot.

When core 42 moves in one direction from its null position the phase polarity of the output signal from the assembly of L. V. D. T. 42—47—48—49 and L. V. D. T. 54—56—57—58 is 180° shifted relative to the phase polarity of said output signal when the displacement of core 42 is in the opposite direction relative to its null position. Phase sensitive detector 103 responds to this phase reversal by reversal of the polarity of its output voltage; consequently needle 114 moves up-scale for one direction of motion of core 42, and down-scale for the other. The particular direction of motion of needle 114 with respect to a given direction of motion of core 42 may be reversed by interchange of any pair of conductors, for example the signal input leads to A. C. amplifier 101, the signal input leads to phase sensitive detector 103, the output leads from phase sensitive detector 103 to meter 110, the leads from oscillator 105 to phase sensitive detector 103, or the excitation leads from oscillator 105 to the assembly comprising L. V. D. T. 42—47—48—49 and L. V. D. T. 54—56—57—58. Thus needle 114 responds to relative motion between table 10 and swivel table 11 as manifested by movement of screw 39 relative to pick-up unit 36 at the right hand end of Fig. 1.

In like manner a similar pick-up unit assembly 35, shown at the left hand end of Fig. 1 is connected, as shown in Fig. 7, in a circuit comprising L. V. D. T. 80—81—82—83 and L. V. D. T. 91—92—93—94, A. C. amplifier 102, phase sensitive detector 104, meter terminals 115 and 116, coil 117 (Figs. 8 and 9), and ultimately to needle 118 of meter 110, needle 118 being responsive to the relative displacement of the core 80 from its null position in exactly the same manner as needle 114 is responsive to the relative displacement of core 42 from its null position.

Referring to Figs. 1 and 7, it may be seen that as table 11 swivels about its pivot stud 12 in a counter-clockwise direction, core 42 of pick-up unit 36 is moved inwardly relative to unit 36, while core 80 of pick-up unit 35 moves at the same time outwardly relative to unit 35. However, needles 114 and 118 are caused to move in the same direction relative to the scale of meter 110 by a simple interchange of leads as described above. The movement of the core 80 caused by deflection of the left hand end of swivel table 11 relative to the deflection-rod 26 causes movement of the needle 118 to give an indication of the extent of deflection of the table 11 due to the swivel adjustment.

Power supply 106 furnishes the necessary low voltage A. C. and high voltage D. C. potentials required for operation of the various amplifier detector and oscillator circuits. The connections between the L. V. D. T.'s and the amplifiers, the connections between the amplifier and the phase sensitive detectors, the connections between the latter and the separate instrumentalities of the meter, as well as the connections between the oscillator to the phase sensitive detectors on one side and to the L. V. D. T.'s on the other side are conductor pairs in this illustrative embodiment of the invention, and the input to the power supply can also be a conductor pair but since the amplifiers and the oscillator need to be fed with D. C. as well as A. C. single lines in the diagram represent as many wires as are necessary to achieve this purpose all as well known in the art.

The pick-up unit 36 is preferably adjustably mounted on the table 10. The clamping block 23 is provided with an upwardly extending arcuate slideway 120 which mates with a correspondingly shaped guideway formed on the underside of the unit 36. A pair of clamping screws 121 (Fig. 2) is provided on unit 36 to facilitate clamping unit 36 in adjusted position on the slideway 120. By adjustment of pick-up unit 36 relative to slideway 120, or by adjustment of screw 39, the needle 114 of the meter 110 may be readily set at zero in setting up of the machine.

The pick-up unit 35 is adjustably mounted on the left hand end of the swivel table 11. The unit 35 may be provided with a horizontally projecting lug 125 having an elongated slot 126. A clamping screw 127 passes through the slot 126 and is screw threaded into the left hand end of the swivel table 11. By adjustment of pick-up unit 35 transversely relative to the swivel table 11, or by adjusting the screw 99, the needle 118 may be readily set at zero in setting up of the machine.

In the mechanism above described, the needle 114 gives an indication of the taper setting of the swivel table 11, and the needle 118 gives an indication of the extent of deflection or bending of the swivel table during the swivel adjustment.

It is desirable to provide a suitable mechanism adjacent to the left hand end of the table to facilitate compensating for deflection of the table. This mechanism comprises a rotatable adjusting screw 130 which is rotatably supported by a bracket 131 fastened to the front edge of the table 10. A reduced cylindrical portion 132 of the screw 130 passes through an elongated slot 133 formed in a boss 134 projecting from the left hand end of the swivel table 11. The left hand end of the screw 130 adjacent to the portion 132 is formed as a partial spherical thrust surface 135. A collar 136, having a partial spherical thrust surface 137 is mounted on the portion 132 of the screw 130. The partial spherical thrust surfaces 135 and 137 are arranged to engage opposite side faces of the boss 134 when the adjusting screw 130 is rotated.

The deflection adjusting screw 130 is preferably normally inoperative so that it does not interfere with the swivel adjustment of the table 11. This is preferably accomplished by provision of a normally disengaged nut which is operatively engaged with the screw 130 only when it is desired to make a deflection compensating adjustment. As illustrated in Fig. 10, the bracket 131 supports a slidably keyed plunger 138, the right hand end of which is threaded and serves as a nut 139 when moved toward the right into engagement with the screw 130. The plunger 138 is normally held in a left hand end or inoperative position by means of a compression spring 140. A rotatable sleeve 141 having a knurled actuating knob 142 is rotatably supported on the plunger 138. The bracket 131 is provided with a pin 143 which rides in a bayonet lock slot 144. It will be readily apparent from the foregoing disclosure that manual movement of knob 142 toward the right (Fig. 10) against the compression of spring 140 serves to move the nut 139 into operative engagement with the screw 130. The knob 142 may be held manually in a right hand end position (Fig. 10) to maintain the nut 139 in operative engagement with the deflection adjusting screw 130 during manual adjustment of the screw 130, or if desired may be locked in position by turning of the knob 142 in a counter-clockwise direction (Fig. 3). When nut 139 is in engagement with screw 130, the screw 130 may be rotated in either direction to adjust the left hand end of the swivel table 11 until the needle 118 reads zero so as to compensate for deflection. After this adjustment has been made, the knob 142 may be released or rotated in a clockwise direction so that the released compression of the spring 140 moves plunger 138 toward the left (Fig. 10) to disengage nut 139 from the screw 130.

The operation of the swivel table alignment mechanism will be readily apparent from the foregoing disclosure. The clamping blocks 22 and 23 are tightened sufficiently to frictionally hold the swivel table 11 in adjusted position relative to the table 10. The swivel adjusting screw 15 is rotated manually to impart a swivelling movement of the table 11 to a predetermined angle by means of the graduated scale 24. A work piece is mounted on the table 11 and a preliminary grinding operation is performed thereon. The work piece is then measured by micrometer or other gauging means to determine whether table 11 is swivelled to produce the desired predetermined taper.

If an additional swivel adjustment is required, the pick-up unit 36 is adjusted by manipulation of the screw 39 to zero the needle 114 on the scale 119 of the meter 110. The swivel adjusting screw 15 is then rotated to impart a further swivel adjustment to the table 11. This adjustment of screw 15 is continued until the needle 114 moves to the desired graduation on the scale 119 of the meter 110. The needle 118 of meter 110 is then checked. Unless needle 118 reads zero, it indicates that the swivel table 11 has been deflected during the swivel adjustment. To compensate for deflection, the knob 142 is moved toward the right (Fig. 10) against the compression of the spring 140 to engage the nut 139 with the adjusting screw 130. The screw 130 may then be rotated in either direction to eliminate deflection in the table 11. This latter adjustment is continued until the needle 118 reads zero thereby eliminating deflection. The knob 144 is then released so that released compression of the spring 140 moves the plunger 138 toward the left (Fig. 10) to disengage the nut 139 from the screw 130 thereby rendering the deflection adjusting screw 130 inoperative.

It may be necessary to make one or more swivel compensating adjustments of the swivel table 11 in order to obtain a predetermined taper on the work piece. After each swivel adjustment, the meter 110 must be checked for deflection.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinabove set forth or shown in the accompanying drawings is to be interpreted as illustrative and not in a limiting sense.

I claim:

1. In a machine tool having a longitudinally movable table, a swivel table pivotally supported thereon, means including a nut and screw mechanism operatively connected between one end of the swivel table and the longitudinally movable table to facilitate a swivelling adjustment of the swivel table, and a deflection indicating mechanism therefor comprising a deflection bar, means to fixedly support one end of said bar at one end of said swivel table, a deflection indicating mechanism interposed between the other end of the swivel table and the deflection bar, and a meter operatively connected to said mechanism visibly to indicate the extent of deflection of the swivel table.

2. In a machine tool, as claimed in claim 1, in combination with the parts and features therein specified of a normally inoperative nut and screw mechanism operatively connected between the other end of the swivel table and the longitudinally movable table adjacent to the deflection indicating mechanism, and manually operable means to render said nut and screw mechanism operative to facilitate adjustment of the swivel table to compensate for deflection.

3. In a machine tool, as claimed in claim 1, in combination with the parts and features therein specified in which the deflection indicating mechanism is mounted on the other end of the swivel table, operative connections between said mechanism and said deflection bar, and means to adjust said mechanism transversely relative to the swivel table to facilitate zeroing the needle of said meter in setting-up the machine.

4. In a machine tool, as claimed in claim 1, in combination with the parts and features therein specified in which one end of the deflection bar is fixedly mounted adjacent to one end of the swivel table, the remainder of the bar being arranged so that the swivel table may be deflected without moving the other end of said bar, a deflection indicating mechanism adjustably mounted on the other end of the swivel table adjacent to the free end of the deflection bar, said deflection indicating mechanism having a movable plunger operatively connected to the free end of the deflection bar which is arranged so that deflection of the table produced during a swivelling adjustment causes a relative motion between the end of the swivel table and the free end of the deflection bar, and operative connections between said movable plunger and the meter visibly to indicate the extent of the deflection of the swivel table.

5. In a machine tool having a longitudinally movable table, a swivel table pivotally supported thereon, means including a nut and screw mechanism operatively connected between one end of the swivel table and the longitudinally movable table, means including a nut and screw mechanism to swivel said swivel table and a taper control indicator mechanism operatively connected between one end of the swivel and the longitudinally movable table to facilitate a precise angular adjustment of the swivel table, a meter having a pair of independent movable needles, one of said needles being responsive to said mechanism visibly to indicate the extent of swivel, a deflection bar having one end fixed to the swivel table adjacent to the nut and screw mechanism, a deflection indicator mechanism interposed between the other end of the swivel table and the other end of said deflection bar, and operative connections between said latter mechanism and a second movable needle in said meter visibly to indicate the extent of deflection of said swivel table due to the swivelling adjustment.

6. In a machine tool, as claimed in claim 5, in combination with the parts and features therein specified of means including a normally inoperative nut and screw mechanism operatively connected between the swivel table and the longitudinally movable table adjacent to the deflection indicator mechanism, and manually operable means to engage said nut with said screw to render said nut and screw mechanism operative to facilitate imparting a transverse adjustment to the end of the swivel table to compensate for deflection.

References Cited in the file of this patent

UNITED STATES PATENTS 2,600,550   Levesque _____ June 17, 1952